United States Patent
Yntema et al.

[11] 3,862,803
[45] Jan. 28, 1975

[54] DIFFERENTIAL LASER GYRO SYSTEM

[75] Inventors: George Busey Yntema, Bolton; David C. Grant, Jr., Simsbury; Richard T. Warner, Winchester, all of Conn.

[73] Assignee: United Aircraft Corporation, East Hartford, Conn.

[22] Filed: Sept. 27, 1968

[21] Appl. No.: 763,277

[52] U.S. Cl. .......... 356/106 LR, 331/94.5, 350/153
[51] Int. Cl. .............................................. H01s 3/05
[58] Field of Search ............. 356/106, 114, 106 LR; 331/94.5; 350/153

[56] References Cited
UNITED STATES PATENTS
3,373,650  3/1968  Killpatrick .................... 356/106 LR
3,508,831  4/1970  Macek .......................... 356/106 LR OTHER PUBLICATIONS
Smith, et al., "A Proposed Method for Reducing the Frequency Locking of a Ring Laser," 2/65, Pg. 161, Proc. Ib i.e., Vol. 53 No. 2.

*Primary Examiner*—Richard A. Farley
*Assistant Examiner*—N. Moskowitz
*Attorney, Agent, or Firm*—M. P. Williams

[57] ABSTRACT

A laser gyro employs both polarization anisotropy and directional anisotropy in the optical path so as to provide two laser gyros operating in the same cavity with cavity modes of different frequencies in the form of mutually opposite polarization (such as both right and left circularly polarized waves, or two waves of mutually perpendicular orientation), in each of the clockwise and counterclockwise directions. Two different species of lasing medium may be utilized so as to reduce interference and source depletion in supplying the four distinct effective frequencies across a wide range of operating conditions. Parameters are adjusted to maintain substantially the same change in oscillation frequency for variations in cavity tuning and other parameters for each of the four frequencies.

29 Claims, 11 Drawing Figures

INVENTORS
GEORGE BUSEY YNTEMA
DAVID C. GRANT, JR.
RICHARD T. WARNER

BY Melvin Pearson Williams
ATTORNEY

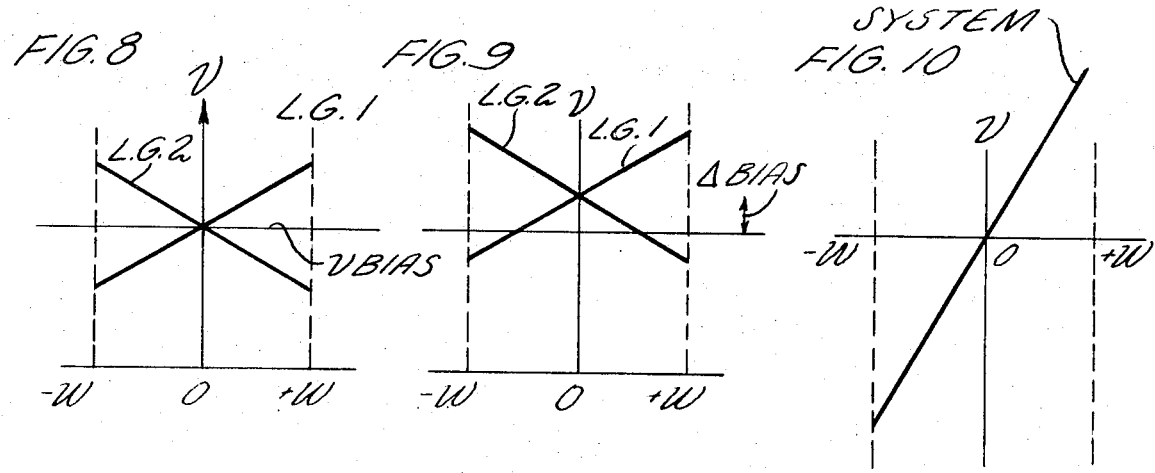
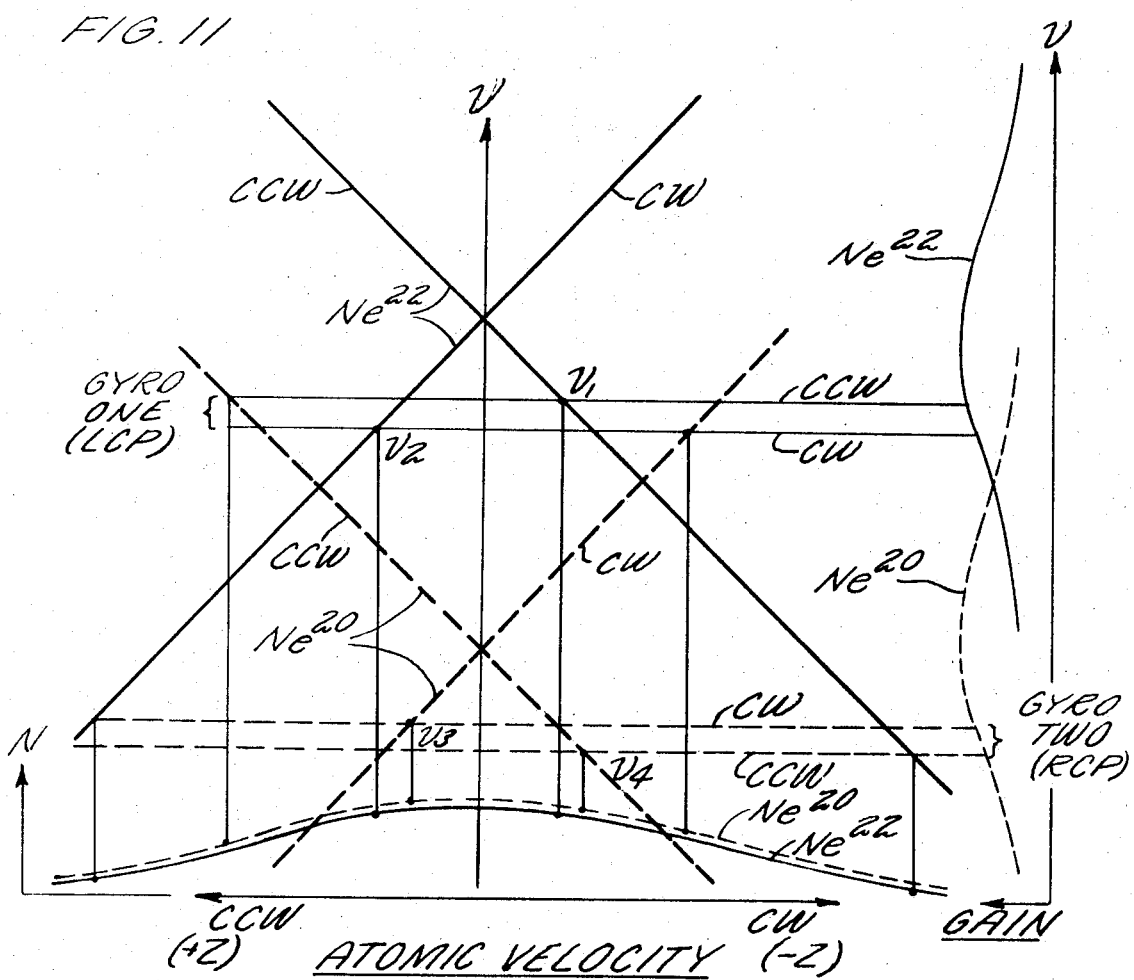

DIFFERENTIAL LASER GYRO SYSTEM

BACKGROUND OF THE INVENTION

1. Field of Art

This invention relates to laser gyros, and more particularly to a differential laser gyro employing polarization eigenstates, at four separate frequencies.

2. Description of the Prior Art

Ring-type lasers, employing electromagnetic traveling waves at the optical or near optical frequencies in a clockwise and counterclockwise direction about a closed path in a principal plane, have been utilized to sense rates of angular rotation, similar in function to the well-known electromechanical gyro. The rotation of the laser requires more time for a traveling wave to complete the optical path in the direction of rotation, and requires less time for a traveling wave to complete the optical path in a direction opposite to the direction of rotation. Thus, if a laser is rotating in the same direction as the clockwise beam, the frequency of the clockwise beam will appear to be less than the natural frequency of the laser, whereas the frequency of the counterclockwise beam will seem to be higher. The difference between the two frequencies is a function of the rate of rotation of the gyro.

A problem encountered in the prior art is that the two beams tend to mode lock; that is, for very low differences in the two frequencies, the two waves interfere with one another and each assumes a frequency which is identical to the other. In fact, one of the two traveling waves, by virtue of intrinsic or momentary lower loss (greater gain), achieves dominance, and by depletion of the gain population, extinguishes the other traveling wave. This effectively results in a deadband for low angular rates of the gyro.

In order to overcome this aspect, various means of biasing the laser, so as to always maintain a frequency difference in excess of that below which mode locking can occur, have been attempted. However, such biasing has resulted in additional problems: D.C. bias tends to drift and is virtually impossible to control to the required degree; A.C. bias necessitates integrating the angular velocity over a period of time in order to average out the bias so as to determine the frequency difference due to rotation; also, the deadband interferes with the beat counting procedure by which otherwise the angle of rotation would automatically be indicated. If bias is introduced by a Faraday cell, stray magnetic fields create outputs which are identical with rotation-caused outputs, and are therefore a further source of error. The bias must be subtracted from the output so as to derive useful information, and this provides a further source of error. A gyro of this general type is disclosed in U.S. Pat. No. 3,373,650 to Killpatrick, and is discussed in detail in an article by Joseph Killpatrick: "The Laser Gyro," *IEEE SPECTRUM*, October 1967, pp. 44–55.

SUMMARY OF THE INVENTION

The object of the present invention is to provide a laser gyro system capable of measuring minute amounts of angular rotation, with no deadband at low angular rates.

According to the present invention:

two laser gyros operating on the same optical path in the same optical cavity are, however, separated sufficiently in frequency so as to be effectively isolated from each other;

each laser gyro is biased so that, throughout its dynamic range of operation, its two oppositely directed traveling waves do not couple or compete with one another;

the bias and isolation is produced in both laser gyros by the same element or elements;

the biasing is achieved in each laser gyro so that the two laser gyros have opposite sensitivity to angular rate;

the isotropic center frequency tuning of the cavity is selected and maintained so that the two laser gyros respond substantially equally to variations in gain, frequency pulling and pushing, and effects of other non-linearities in the system;

and, by taking the difference between the outputs of the two laser gyros, variations in isolation, bias, and other non-linear parameter effects are substantially cancelled, and the gyro system sensitivity to angular rate is effectively doubled.

In accordance with the present invention, the two gyros may be implemented either with circular polarization or plane polarization; in one embodiment, one of the laser gyros is implemented with right-hand circular polarization and the other laser gyro is implemented with left-hand circular polarization; in another embodiment, a first laser gyro is partially implemented with plane polarization of a first orientation, and the other laser gyro is partially implemented with plane polarization which is perpendicular to the polarization of the first laser gyro.

In further accord with the present invention, in order to reduce mutual perturbation and competition for excited atoms, the four frequencies are caused to be excited by two different species of lasing medium. Specifically, in one embodiment, one of the species may mainly support left circularly polarized radiation whereas the other of the species mainly supports right circularly polarized radiation. In an alternative embodiment the species principally support mutually perpendicular plane polarized waves. Thus, where there might otherwise be a tendency for one wave to deplete the population of excited atoms supplying energy to another wave so as to prevent oscillation or create perturbation in the second wave, oscillations constituted of waves traveling in the same direction are well separated in frequency and draw energy from different species so that essentially four separate reactions can occur, each of the species primarily supporting two laser beams, one clockwise and one counterclockwise which do not interfere with each other in terms of gain or population competition. In addition, any backscattered wave is attenuated since it does not satisfy resonance conditions.

In accordance more specifically with the present invention, the isolation of the two laser gyros is achieved by disposing a polarization anisotropy within the optical path, the anisotropic optical element acting as an optically active element on circular polarization, and acting as a birefringent element on plane polarization. Thus, the implementation of the two laser gyros with circular polarization can be achieved by using an optically active polarization anisotropy, which may comprise, for instance, a quartz crystal cut with the optic axis thereof parallel to the optical path of the laser gyros. On the other hand, the two laser gyros may be implemented in plane polarization by utilizing a birefringent polarization anisotropy which may comprise a quartz crystal cut with the optic axis thereof perpendicular to the optical path of the laser gyros.

In further specific accord with the present invention, the biasing of each laser gyro, so that its two oppositely directed traveling waves do not couple or compete, may be achieved by disposing within the optical path of the laser gyros a directional anisotropy, such as a Faraday cell; the Faraday cell may comprise the above-mentioned quartz crystal in a magnetic field, or it may comprise an auxiliary optical element exhibiting a Faraday effect placed in a magnetic field, such as fused silica.

The present invention provides a differential laser gyro system. The characteristics of each of the laser gyros may be independently adjusted in a variety of ways so as to provide a wide variety of operating conditions. On the other hand however, since the controls over each of the gyros (such as the isolation between them and the bias of each) is provided by the same physical elements, the variations in parameters such as magnetic field, temperature, etc., are mutually cancelled by virtue of the fact that a differential system output is utilized. A gyro system in accordance with the present invention is therefore much less sensitive to variations in operating conditions than those heretofore available in the art. Additionally, a gyro system of doubled sensitivity is achieved by utilization of a differential output resulting from two separate laser gyros operating in the same cavity. Thus, the gyro system in accordance herewith has an inherent greater bias stability and sensitivity than those heretofore available in the art.

The foregoing and other objects, features and advantages of the present invention will become more apparent in the light of the following detailed description of preferred embodiments thereof, as illustrated in the accompanying drawing.

BRIEF DESCRIPTION OF THE DRAWING

FIG. 8 is a diagram of the individual response curves of output frequency vs. angular rotation, for the two laser gyros incorporated in a laser gyro system of the present invention;

FIG. 9 is a chart similar to that of FIG. 8 illustrating the alteration of the response curves as a function of a change in bias;

FIG. 10 is a composite response curve of frequency output vs. angular rotation, for a gyro system of the present invention; and FIG. 11 is a graphic representation of the frequency of light as seen by vibrating atoms and population of atoms, all as a function of clockwise or counterclockwise atomic velocities illustrating characteristics of two modes of the cavity in resonance with atoms of different lasing medium species, but of similar velocities; and of gain as a function of frequency.

DESCRIPTION OF THE PREFERRED EMBODIMENT

Figure 1:
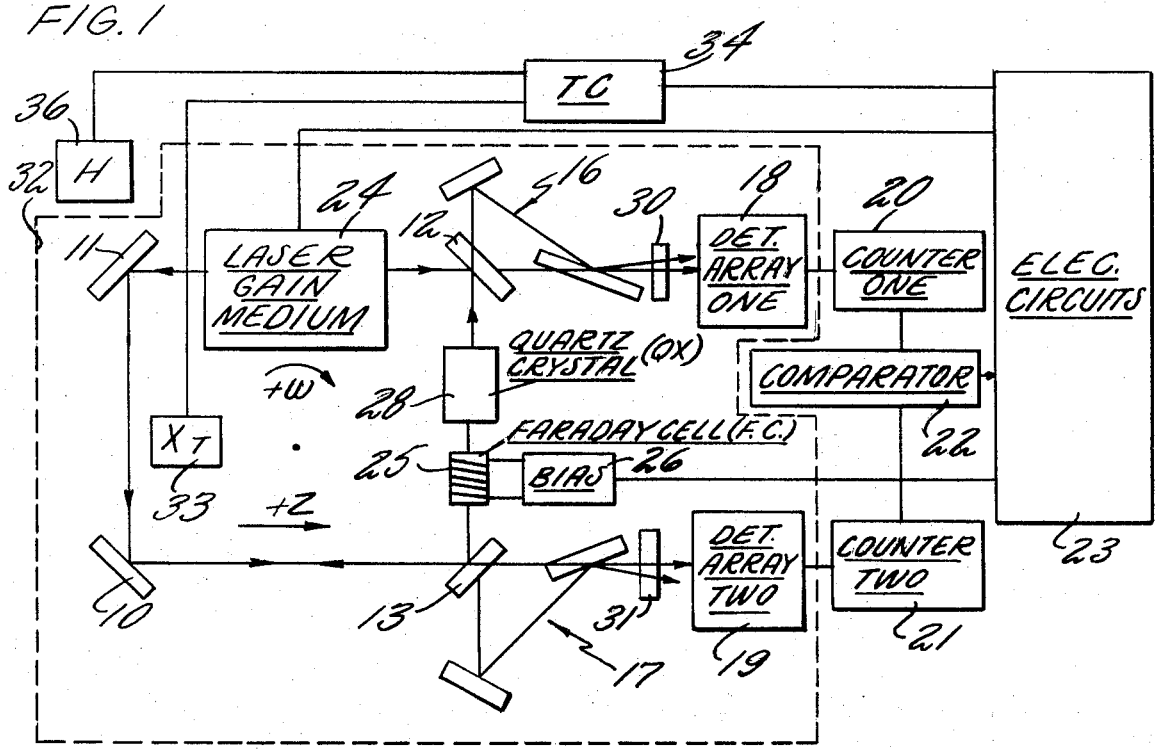
FIG. 1 is a simplified schematic diagram of a laser gyro system employing circular polarization in accordance with the present invention.

Referring now to FIG. 1, one embodiment of a single axis component of laser gyro system in accordance with the present invention comprises a ring laser having four mirrors 10-13, the mirrors 12 and 13 being partially reflecting so as to allow light to pass therethrough to related optic systems 16, 17 for directing light into corresponding photosensing apparatus or detecting arrays 18, 19, the output of which operates electronic detection counters 20, 21 of the type well known in the prior art. The outputs of the counters 20, 21 are summed in a comparator 22, which in turn feeds electronic gyro circuitry 23.

Figure 6:
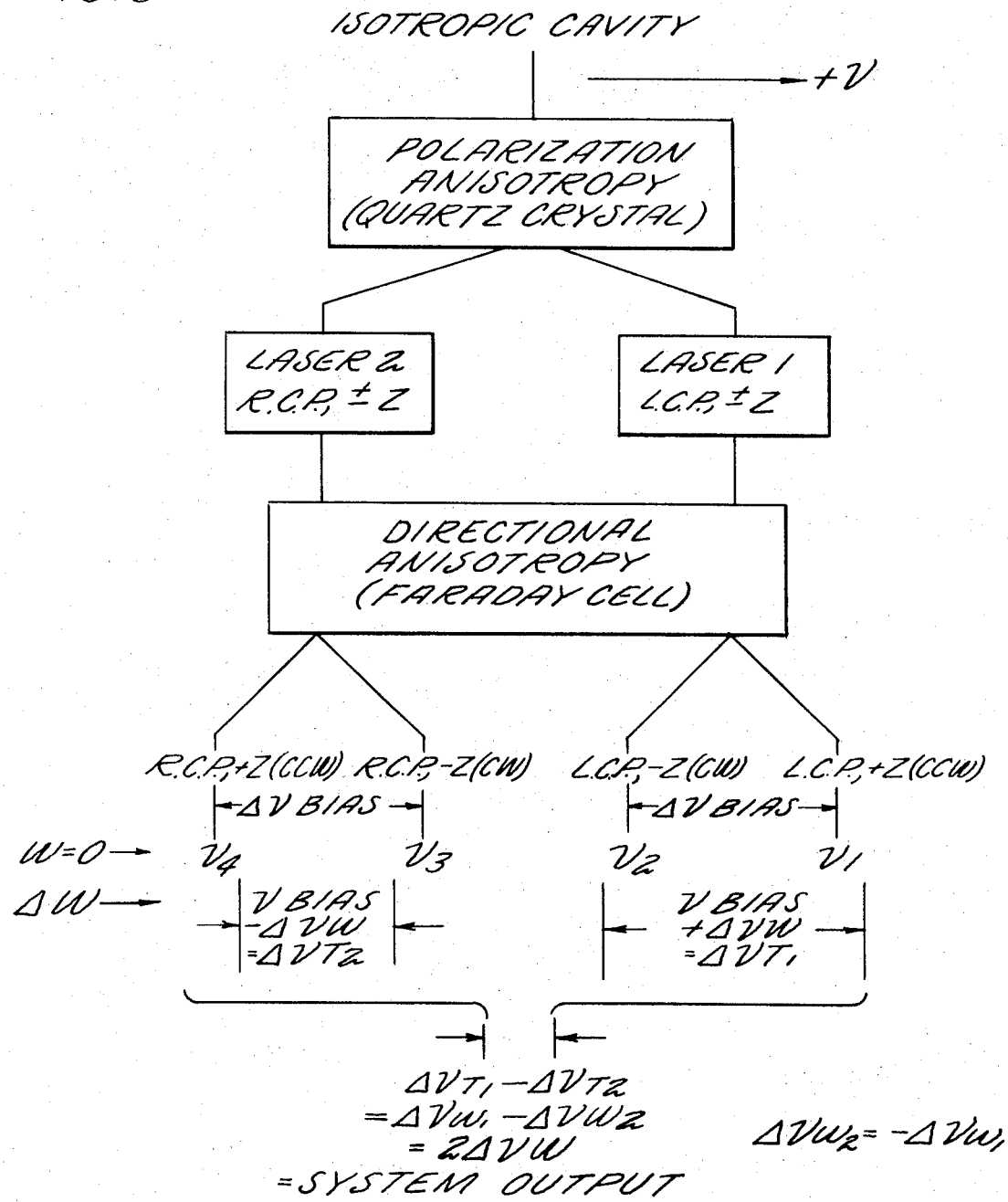
FIG. 6 is a diagrammatic chart illustrating the basic principle of the present invention.
Figure 7:
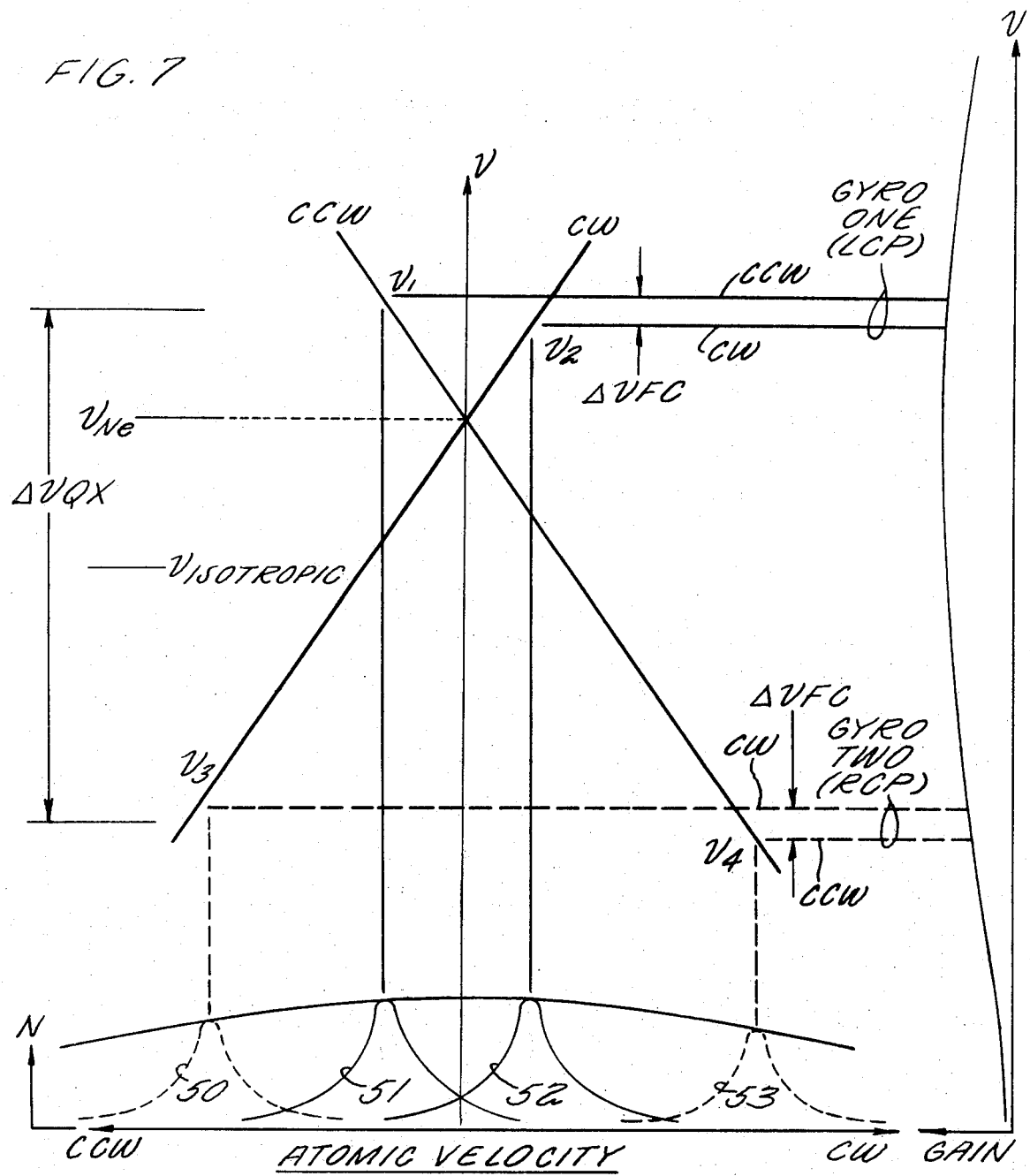
FIG. 7 is a diagram indicating the relationships between frequencies of the lasing modes and the velocities of atoms which are in resonance with these modes.

The laser shown in FIG. 1 is provided with a laser gain medium 24, which may be controlled by the circuits 23. Disposed within the optical path of the gyro is a directional anisotropic optical element, such as a Faraday cell 25 (FC) which may be supplied electric current by a bias power supply 26 to produce a magnetic field parallel to the optical path, under control of the circuits 23. Alternatively, the Faraday cell may be provided the magnetic field of a permanent magnet. The Faraday cell causes the clockwise traveling wave of light energy in the cell to pass therethrough at a different speed than the counterclockwise traveling wave of the same circular polarization whereby the frequencies of the clockwise and counterclockwise waves are separated. In addition, a polarization anisotropic element 28, such as a quartz crystal (QX) with its optic axis parallel to the optical path, positioned within the optical path of the laser, causes right circularly polarized traveling waves and left circularly polarized traveling waves to pass therethrough at different speeds, without regard to whether they are in the clockwise or counterclockwise direction. Thus, by joint action of the Faraday cell 25 and the quartz crystal 28, four different frequencies of light are created within the laser gyro for each integral number of wave lengths in the loop of the ring laser. This is illustrated in FIGS. 6 and 7, wherein the left circularly polarized light is at a higher frequency than the right circularly polarized light, for instance. FIG. 7 also illustrates that, of the right circularly polarized light, that which travels in a clockwise direction will have (for example) a higher frequency than that traveling in a counterclockwise direction, due to the effect of the Faraday cell 25. Similarly, of the left circularly polarized light, that which travels in a clockwise direction will be at a lower frequency than that which travels at a counterclockwise direction as a result of the Faraday cell 25. The effects of the quartz crystal 28 and the Faraday cell 25, as such, are well known.

The optic systems 16, 17 each include a polarized filter 30, 31. The filter 30 passes left circularly polarized light and blocks right circularly polarized light, and the filter 31 passes right circularly polarized light and blocks left circularly polarized light. Thus, the respective pairs of beams of the two laser gyros in a gyro system of the present invention are separately applied to corresponding counters 20, 21. Thus the elements 16, 30, 18 and 20 comprise portions of gyro ONE and the elements 17, 31, 19 and 21 comprise elements of gyro TWO.

A gyro system in accordance with the present invention is preferably provided with a shield 32 to significantly reduce interference by the earth's magnetic field (and other stray fields). Additionally, the shield can provide a lowgradient thermal path to assist in temperature control of the gyro system. A temperature transducer (XT) 33 may be suitably disposed to accurately detect a mean temperature of the gyro system, the output thereof feeding a temperature control circuit (TC) 34, which may also be controlled by the electronic circuits 23. The temperature control 34 in turn will provide suitable control over a heater element (H) 36 which may preferably deliver heat to the shielding 32 so as to uniformly distribute heat, as necessary, to the laser gyro system, thereby to maintain its temperature constant. Maintaining the temperature of the gyro substantially constant will control the length of the ring laser cavity about the mirrors 10–13, and therefore holds the isotropic cavity frequency to close tolerances.

Figure 2:
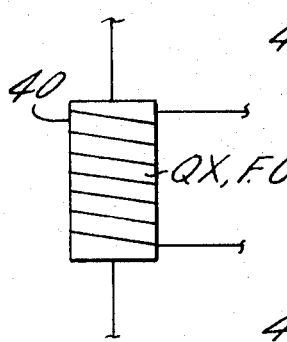
FIG. 2 is a simplified schematic diagram of an alternative polarization and directional anisotropy producing means.

As illustrated in FIG. 1, the Faraday cell 25 may comprise an element distinct from the quartz crystal 28. Thus, a fused quartz element provided with a suitable magnetic field (as described hereinbefore) may comprise the Faraday cell 25. The directional anisotropy of the Faraday cell is provided by the magnetic field in quartz, and the quartz need not be crystalline. On the other hand, the polarization anisotropy is provided by the characteristics of the quartz crystal 28. If desired, these two anisotropies may be provided by a single quartz crystal 40 provided with a suitable magnetic field as illustrated in FIG. 2. In other words, the directional anisotropy can be achieved by providing a suitable magnetic field in a quartz cystal utilized to provide the polarization anisotropy, if desired to suit any implementation of the present invention.

Figure 3:
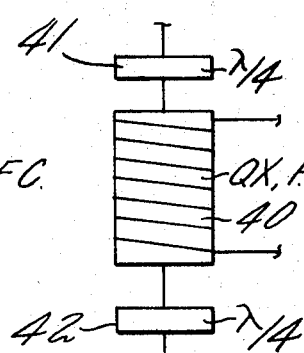
FIGS. 3-5 are simplified schematic illustrations of variations in the embodiments of FIGS. 1 and 2 employing quarter-wave plates to convert the waves between plane and circular polarization.
Figure 4:
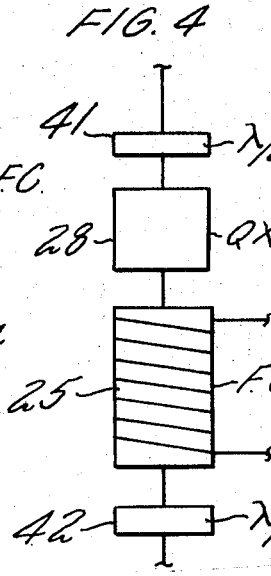
Figure 5:
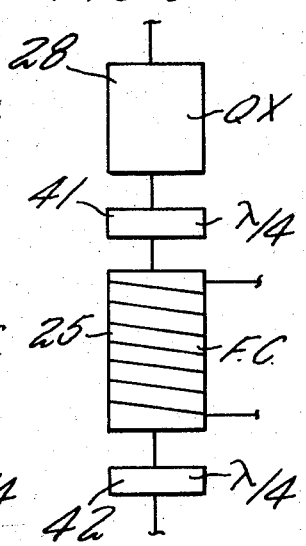

The description of the embodiments of FIGS. 1 and 2 hereinbefore assume that the traveling waves of the two laser gyros are implemented in mutually opposite circularly polarized traveling waves. However, if desired to suit any utilization of the present invention, quarter-wave plates 41, 42 (FIGS. 3–5) may be inserted on opposite sides of the directional anisotropy so that the four traveling waves within the ring laser of FIG. 1 will comprise both clockwise and counterclockwise waves of mutually perpendicular plane polarization except along the part of the optical path where the traveling waves pass through the Faraday cell. This may be implemented as illustrated in FIG. 3 by providing the quarter-wave plates 41, 42 on opposite sides of a combined anisotropic element 40 (of the type shown in FIG. 2). It may also be implemented, as illustrated in FIGS. 4 and 5, with separate Faraday cell 25 and quartz crystal 28 to provide the two anisotropies. As seen in FIG. 4, both the Faraday cell 25 and the quartz crystal 28 may be disposed between the quarter-wave plates 41, 42, since the quartz crystal will have an opposite velocity effect upon mutually opposite circularly polarized waves. Or, the quartz crystal 28 may be outside the quarter-wave plates 41, 42 as seen in FIG. 5 since the quartz crystal may be cut with the optic axis perpendicular to the light path so as to have mutually opposite velocity effects on traveling waves of mutually perpendicular plane polarization. In other words, so long as the four traveling waves within the ring laser cavity are of mutually opposite circular polarization as they pass through the directional anisotropy (25 or 40), it is immaterial to the present invention whether circular or plane polarization is utilized in the remainder of the optical path, including the polarization anisotropy (28 or 40). In the embodiments of FIGS. 1, 2 and 4, the quartz crystal (QX) is positioned with its optic axis parallel to the optical path; as such, it acts as an optically active element. In the embodiments of FIG. 5, the quartz crystal is mounted with its optic axis transverse to the optical path so as to act as a birefringent element and pass one orientation of plane polarized light at a different speed than the other orientation.

The following description is given in terms of circular polarization (FIGS. 1 and 2), but equivalent reasoning applies to plane polarization (FIGS. 3–5).

The gyro system of this invention may readily be implemented in solid quartz, as is known in the art, or through other known techniques.

The system aspects of a laser gyro system in accordance with the present invention and described thus far with respect to FIGS. 1–5 are illustrated in the chart of FIG. 6. In the chart of FIG. 6, the effects of a rotation $w$ are illustrated; this rotation $w$ is in the clockwise direction as illustrated in FIG. 1. The $+z$ direction is shown in FIG. 1 to be counterclockwise. If one considers starting at an isotropic or average cavity frequency (top of FIG. 6) then two lasers are created by the polarization anisotropy of the quartz crystal 28. Thus, laser ONE is implemented with left circularly polarized light in both the $+z$ and $-z$ directions and laser TWO is implemented with right circularly polarized light in both the $+z$ and $-z$ directions. Biasing for both lasers is achieved by the single directional anisotropy of the Faraday cell 24. This results in laser ONE having left circularly polarized light in the $+z$ direction and left circularly polarized light in the $-z$ direction, at two different frequencies which are a function of the bias provided by the Faraday cell 24. Similarly, laser TWO has right circularly polarized light in the $-z$ direction, and right circularly polarized light in the $+z$ direction, the difference between the two frequencies being a function of the same bias provided by the same Faraday cell as for gyro ONE. Thus, if the rotation $w$ is equal to zero, the two frequencies of the right circularly polarized laser are separated by an amount nearly equal to the amount by which the two frequencies of the left circularly polarized laser are separated. Upon the introduction of an angular rotation, for instance $+w$, to the laser gyro, the frequencies of the four traveling waves change. Those traveling waves which are in the same direction as the angular rotation $+w$ will have a lower frequency, and those traveling waves which are in the opposite direction will have a higher frequency. Thus, the traveling waves in the $-z$ direction (at frequencies $v2$ and $v3$), are lower, whereas the waves traveling in the $+z$ direction ($v1$, $v4$) become higher in frequency. Since the cavity frequency and the parameters of the polarization and directional anisotropic elements are chosen so as to give the frequency arrangements illustrated in FIG. 6, it can be seen that the total frequency difference between the two traveling waves of the right circularly polarized laser (laser TWO) come closer together in frequency, whereas the two traveling waves of the left circularly polarized laser (laser ONE) become separated by a higher frequency. This results in the differential action required for a differential laser gyro system in accordance with the present invention. It is this aspect, referred to hereinbefore, which is one of the important features of the present invention. Obviously, the output of the two separate laser gyros may be subtracted, one from the other, so as to provide an output equal to their difference, which is twice the frequency change effect in either one of them.

Referring now to FIG. 7, the operational characteristics of a laser gyro system in accordance with FIG. 1 must be considered in terms of the relationship between the atoms of the lasing medium, and the light stimulating those atoms. FIG. 7 is a combined plot of the population (N) of lasing medium atoms (such as neon) and frequency in the frame of reference of the apparatus ($\nu$) of the traveling waves resonant with the atoms as a function of atomic velocity component in the clockwise or counterclockwise direction.

FIG. 7 includes a plot of gain as a function of frequency. In a helium-neon laser, the helium excites the neon so that each neon atom is capable of releasing energy into an optical wave which has the proper frequency as seen by the atom. To the extent that the atomic velocity due to thermal agitation at any given moment is not parallel with the optical path, then light energy physically interfering with the atom appears to have the same frequency as it appears to have to a point totally at rest. But to the extent that an atom has a velocity component parallel to the optical path, the frequency of the light, as seen by it, is Doppler-shifted. Because of thermal agitation, there is a Gausian distribution of the numbers of atoms (N) which have various velocities relative to the system of mirrors. There are atoms which have clockwise components so that in order to be in resonance with these atoms, clockwise radiation in the laser gyro must have a higher frequency, whereas counterclockwise radiation in the laser gyro must have a lower frequency to be in resonance with the same atoms; and there are atoms which have counterclockwise components, thus being in resonance with electromagnetic radiation in the counterclockwise direction having a higher frequency and radiation in the clockwise direction having a lower frequency. In FIG. 7, the relationships between atomic velocity and the frequencies of electromagnetic waves which would be in resonance with the atoms are indicated by the diagonal lines. The modes constituting a first laser gyro are shown by horizontal solid lines. These are clockwise and counterclockwise left circularly polarized. Similarly, modes constituting a second gyro are shown by dashed horizontal lines. These are right circularly polarized. The differences between the frequencies of these modes are identified in FIG. 7 in terms of the gyro isolation frequency difference caused by the polarization anisotropy of the quartz crystal and the bias frequency difference caused by the directional anisotropy of the Faraday cell. The splittings are not shown to scale; a typical value of isolation splitting might be $10^8 H_z$ while that for bias splitting might be $10^5 H_z$. The counterclockwise wave of gyro ONE has a higher frequency than the clockwise wave therein; but on the contrary, the clockwise wave of gyro TWO is at a higher frequency than the counterclockwise wave thereof.

In FIG. 7, the resonant frequency for a neon atom $\mu_{Ne}$ is presumed to be that of neon having an atomic weight of 20, since natural neon has roughly 91 percent neon[20] and 9 percent neon[22]. The conditions shown in FIG. 7 relate to the case, chosen arbitrarily for illustration, where the isotropic cavity frequency, that is, the frequency of electromagnetic waves in the cavity averaging out the anisotropic effects of the Faraday cell and the quartz crystal, is chosen to be lower than the resonant frequency of a stationary neon atom. ($\mu_{ISO} > \mu_{Ne}$) The frequency splittings provide two laser gyros of opposite polarization each operating independently of the other, on the same optical path; these lasers are isolated from each other by the frequency splitting caused by the phase anisotropy of the quartz crystal, and each avoids mode locking by the bias splitting provided by the directional anisotropy of the Faraday cell. It should be noted that the difference in frequency between the clockwise and counterclockwise traveling waves, both for right circularly polarized light and left circularly polarized light, is equivalent to a bias in a given rotational direction. The purpose of this bias is the same as that in the prior art: to avoid mode locking at zero and low angular rates. The bias introduced in gyro ONE is opposite and almost exactly equal to the bias in gyro TWO. The biases will substantially cancel each other; therefore they need not be highly stable. This is a primary feature of the present invention.

As an aid in understanding the illustration of FIG. 7, consider first that a given lasing medium is to be employed, such as neon. The open-loop gain of the laser medium can be plotted as a function of frequency, and as such represents the gain available to electromagnetic radiations of the various frequencies along the plot in an open-loop amplifier configuration. By proper choice of optical parameters one can provide a suitable set of cavity modes such that they will be effectively isolated from one another yet still appear on the curve of laser medium gain versus frequency so that each of the four frequencies has a gain in excess of the cavity loss; this means that oscillations can be sustained at each frequency. At the bottom of FIG. 7, the numbers of atoms participating in the oscillations at the four various frequencies are illustrated by the respective Lorenzian plots 50-53. Thus it can be seen that oscillations of electromagnetic traveling waves at four distinct frequencies can be sustained on the same optical path so as to provide two independent laser gyros, each having suitable bias to avoid mode locking at low angular rates.

In FIG. 8, the frequency vs. angular rotation characteristics of the two separate laser gyros are plotted. Thus it can be seen that laser gyro ONE has an increasing beat frequency with an increase in angular velocity, where laser gyro TWO has a decreasing beat frequency with an increase in positive angular rotation. Because the output of the laser gyro system is the difference of the two laser gyros within it, this output appears as in FIG. 10 and has a gain which has twice the slope of either one of them, and passes through zero beat frequency almost exactly at zero angular rate. This is another important feature of the present invention: by utilizing the differential output of two biased laser gyros which operate independently in the same optical path, the total gyro system characteristic is one having a steep slope and passing very nearly through the origin, which has not been achieved heretofore with biased laser gyros in the prior art.

In the event that a shift in bias occurs within the laser gyro system in accordance with the present invention, it will cause both of the laser gyros within the cavity to shift their output characteristics (FIG. 9). But since the gyro system output is the difference between them, this will result in an overall system characteristic as illustrated in FIG. 10 just as is true in the case of FIG. 8. In other words, the bias is substrative so that any shift in bias is cancelled to a substantial extent. The feature of bias shifting being cancelled is also indicated algebraically at the bottom of FIG. 6.

Another aspect of this differential effect with respect to bias is that the bias need not be bucked out by the sensing mechanisms, or averaged to zero over time, as is true in the prior art. In other words, any angular rotation which is read with prior art biased laser gyros requires that the biased component be removed before a reading can be obtained. The present invention overcomes this since the bias factors for each of the laser gyros tend to substantially cancel each other out, thus providing for direct reading.

With the laser cavity resonated as illustrated in FIG. 7, and with the bias splitting ($\Delta\mu FC$) small as compared to the isolation splitting ($\Delta\mu QX$), it may be seen that the four frequencies of light may be spaced unevenly on the population curve. The probability of stimulated emission is indicated by the dotted lines 50-53 at the bottom of FIG. 7. The stimulation of photon emission in any given atoms remove those atoms from usefulness, as far as further laser operation is concerned, until they are again re-energized. This may result in a tendency toward population depletion at the various velocities of atoms, and can cause each oscillating mode to affect the frequencies and amplitudes of the other three modes, since each is drawing some light energy from atoms at all velocities. Perturbation of oscillation between the various frequencies can result to a degree under certain conditions of operation, and the stability of such perturbations may not be guaranteed in all cases. It is this characteristic to which a second aspect of the invention is directed, as set forth in the following paragraph.

In accordance with the second aspect of the present invention, the helium-neon laser medium (FIG. 1) is provided with an artificially generated neon mixture which is roughly 50 percent neon of atomic weight 20 and 50 percent neon of atomic weight 22. Since the neon$^{20}$ has a lower line frequency than neon$^{22}$ (by about 261 Mega-Herz), they will intersect curves of the type illustrated in FIG. 7 in a different fashion. One such fashion is illustrated in FIG. 1, wherein the population of each of the isotopes as a function of atomic velocity is plotted. In this case, a high population of neon$^{22}$ is stimulated by the waves of gyro ONE: left circularly polarized counterclockwise ($\mu_1$). and clockwise ($\mu_2$) waves. On the other hand, the waves of gyro TWO ($\mu_3$, $\mu_4$) stimulate a high population of neon$^{20}$. In addition, the right circularly polarized light of gyro TWO ($\mu_1$, $\mu_2$) also stimulate low population neon$^{22}$, and the left circularly polarized light of gyro ONE ($\mu_3$, $\mu_4$) stimulates low population neon$^{20}$. These, however, are sufficiently spread so as not to interfere with one another, bearing in mind that the stimulation of one of the isotopes at one frequency has no bearing on the stimulation of another isotope at approximately the same point on the population curve. Thus, the present invention provides sources for photon emission at each of the four frequencies with reduced perturbation.

As illustrated in FIG. 1, the several embodiments of the present invention utilize four mirrors 10-13. When circularly polarized light is reflected from a mirror, the orientation of polarization reverses: in other words, if it is right circularly polarized as incident to the mirror, it is left circularly polarized when emanating from the mirror. In order to prevent an odd number of reversals, whereby oscillations could not be sustained, four mirrors are provided so that an even number of reversals will occur about the laser ring. Although the embodiments have been described hereinbefore with respect to right and left circularly polarized light as if it existed in one or the other sense throughout the optical path of the laser gyro, it should be understood that the particular sense of polarization referred to herein is that sense which exists in the part of the optical path where the Faraday cell is located. Also, if plane polarized light is used in other than the Faraday cell (FIGS. 3-5), the phase of one of the polarized waves is reversed as a result of reflecting from each mirror; provided an even number of mirrors are utilized, then this effect is cancelled. Thus, whether or not the quarter-wave plates are utilized, an even number of mirrors eliminates the effects of sense or phase reversal which can occur as a result of light reflecting therefrom, but an odd number may be used if the relevant phenomena are taken suitably into account.

Although the invention has been shown and described with respect to a preferred embodiment thereof, it should be understood by those skilled in the art that the foregoing and other changes and omissions in the form and detail thereof may be made therein without departing from the spirit and the scope of the invention.

Having thus described typical embodiments of our invention, that which we claim as new and desire to secure by Letters Patent of the United States is:

1. A laser gyro system comprising:
    a ring laser comprising a closed loop optical cavity and a lasing medium;
    and means including a quartz crystal providing polarization anisotropy and directional anisotropy within the optical path of said ring laser.

2. A laser gyro system according to claim 1 wherein said means comprises a quartz crystal having therein a magnetic field parallel with the optical path of said ring laser.

3. A laser gyro system according to claim 2 further comprising a pair of quarter-wave plates disposed in said optical path on opposite sides of said quartz crystal.

4. A laser gyro system according to claim 1 wherein said means provides the polarization anisotropy of an optically active element.

5. A laser gyro system according to claim 1 wherein said means provides the polarization anisotropy of a birefringent optical element and further comprising:
    a pair of quarter-wave plates disposed in said optical path on opposite sides of said means.

6. A laser gyro system according to claim 1 wherein said means comprises:
    a polarization anisotropic optical element located within the optical path of said ring laser;
    and a directional anisotropic optical element located in the optical path of said ring laser.

7. A laser gyro system according to claim 6 wherein said polarization anisotropic optical element comprises an optically active element.

8. A laser gyro system according to claim 6 wherein said polarization anisotropic optical element comprises a birefringent optical element and further comprising:
a pair of quarter-wave plates located in the optical path on opposite sides of said directional anisotropic optical element.

9. A laser gyro system comprising:
a ring laser comprising a closed loop optical cavity and a laser gain medium comprising a substantially equal gain mixture of two species of lasing substance;
and means providing polarization anisotropy and directional anisotropy in the optical path of said ring laser.

10. A laser gyro system according to claim 1 wherein said lasing medium comprises a substantially equal gain mixture of two species of lasing gas, said two species having mutually distinctive line frequencies of transition between energy levels.

11. A laser gyro system according to claim 6 wherein said lasing medium comprises a substantially equal mixture of two species of lasing gas, said two species having mutually distinctive line frequencies of transition between energy levels.

12. A laser gyro system according to claim 9 wherein said lasing medium comprises a substantially equal mixture of two species of lasing gas, said two species having mutually distinctive line frequencies of transistion between energy levels.

13. A laser gyro system according to claim 9 wherein said two species comprise two isotopes of the same lasing gas.

14. A laser gyro system according to claim 10 wherein said two species comprise two isotopes of the same lasing gas.

15. A laser gyro according to claim 13 wherein said two species consist of neon of atomic weight 20 and neon of atomic weight 22.

16. A laser gyro according to claim 14 wherein said two species consist of neon of atomic weight 20 and neon of atomic weight 22.

17. A laser gyro system according to claim 1 wherein the parameters of said means are chosen so that there is provided a pair of laser gyros separated in frequency each implemented in a polarization which is distinct from the other, each having a bias which is opposite to but substantially equal in magnitude to the bias of the other.

18. A laser gyro system according to claim 6 wherein the parameters of said means are chosen so that there is provided a pair of laser gyros separated in frequency each implemented in a polarization which is distinct from the other, each having a bias which is opposite to but substantially equal in magnitude to the bias of the other.

19. A laser gyro system according to claim 9 wherein the parameters of said means are chosen so that there is provided a pair of laser gyros separated in frequency each implemented in a polarization which is distinct from the other, each having a bias which is opposite to but substantially equal in magnitude to the bias of the other.

20. A laser gyro according to claim 17 wherein said lasing medium comprises a substantially equal gain mixture of the atoms of two species of lasing gas, said two species having mutually distinctive line frequencies of transition between energy levels, and wherein the electromagnetic waves of one of said gyros sustain oscillation as a result of energy suppled primarily by one of said species, and the electromagnetic waves of the other of said gyros sustain oscillations as a result of energy supplied primarily by the other of said species.

21. A laser gyro according to claim 18 wherein said lasing medium comprises a substantially equal mixture of the atoms of two species of lasing gas, said two species having mutually distinctive line frequencies of transition between energy levels, and wherein the electromagnetic waves of one of said gyros sustain oscillation as a result of energy supplied primarily by one of said species, and the electromagnetic waves of the other of said gyros sustain oscillations as a result of energy supplied primarily by the other of said species.

22. A laser gyro according to claim 19 wherein said lasing medium comprises a substantially equal gain mixture of the atoms of two species of lasing gas, said two species having mutually distinctive line frequencies of transition between energy levels, and wherein the electromagnetic waves of one of said gyros sustain oscillation as a result of energy supplied primarily by one of said species, and the electromagnetic waves of the other of said gyros sustain oscillations as a result of energy supplied primarily by the other of said species.

23. A differential laser gyro system comprising:
ring laser means for establishing two independent laser gyros on a single optical path;
and means responsive to said independent laser gyros for producing a gyro system output indication equal to the difference between their independent outputs.

24. A differential laser gyro system according to claim 23 wherein said ring laser means includes a quartz crystal disposed in the optical path thereof.

25. A differential laser gyro system according to claim 23 including means providing an angular rate bias in each of said laser gyros.

26. A differential laser gyro system according to claim 25 wherein a single angular rate bias means provides mutually opposite bias for said laser gyros, whereby substantial cancellation of bias is provided by said gyro system output indication means.

27. A differential laser gyro system according to claim 23 wherein the laser gain medium of said ring laser means comprises a substantially equal gain mixture of two species of a lasing gas.

28. A differential laser gyro system according to claim 27 wherein the laser oscillation of each laser gyro is primarily supported by a respective one of said species.

29. A differential laser gyro system according to claim 23 wherein said ring laser means includes means to cause said two laser gyros to operate at mutuallly mutually wavelengths.

* * * * *

PO-1050
(5/69)

UNITED STATES PATENT OFFICE
CERTIFICATE OF CORRECTION

Patent No. 3,862,803          Dated January 28, 1975

Inventor(s) George B. Yntema, David C. Grant, Jr., Richard T. Warner

It is certified that error appears in the above-identified patent and that said Letters Patent are hereby corrected as shown below:

Column 7, line 64, "$\mu_{Ne}$" should read -- $\nu_{Ne}$ --

Column 8, line 6, "$(\mu_{ISO} > \mu_{Ne})$" should read -- $(\nu_{ISO} > \nu_{Ne})$ --

Column 9, line 20, "$(\Delta\mu FC)$" should read -- $(\Delta\nu FC)$ --

Column 9, line 21, "$(\Delta\mu QX)$" should read -- $(\Delta\nu QX)$ --

Column 9, line 52, "$(\mu_1)$" should read -- $(\nu_1)$ --

Column 9, line 52, "$(\mu_2)$" should read -- $(\nu_2)$ --

Column 9, line 53, "$(\mu_3,$" should read -- $(\nu_3,$ --

Column 9, line 54, "$\mu_4)$" should read -- $\nu_4)$ --

Column 9, line 55, "$(\mu_1,$" should read -- $(\nu_1,$ --

Column 9, line 56, "$\mu_2)$" should read -- $\nu_2)$ --

Column 9, line 57, "$(\mu_3,\mu_4)$" should read -- $(\nu_3,\nu_4)$ --

Column 12, line 59, Claim 29, "mutuallly" should read

-- mutually --

Column 12, line 60, Claim 29, "mutually" should read

-- distinct --

Signed and sealed this 29th day of April 1975.

(SEAL)
Attest:

RUTH C. MASON
Attesting Officer

C. MARSHALL DANN
Commissioner of Patents
and Trademarks